United States Patent
Cheng

(10) Patent No.: US 12,220,890 B2
(45) Date of Patent: Feb. 11, 2025

(54) METHODS FOR FABRICATING SOLID LAMINATE STRINGERS ON A COMPOSITE PANEL

(71) Applicant: The Boeing Company, Chicago, IL (US)

(72) Inventor: Jiangtian Cheng, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 467 days.

(21) Appl. No.: 16/793,559

(22) Filed: Feb. 18, 2020

(65) Prior Publication Data

US 2021/0252817 A1    Aug. 19, 2021

(51) Int. Cl.
*B29D 99/00* (2010.01)
*B29C 70/34* (2006.01)
(Continued)

(52) U.S. Cl.
CPC ........ *B29D 99/0014* (2013.01); *B29C 70/342* (2013.01); *B29C 70/44* (2013.01); *B29D 99/0003* (2013.01); *B29D 99/001* (2013.01); *B64C 1/064* (2013.01); *B64C 3/182* (2013.01); *B29L 2031/3082* (2013.01); *B64C 2001/0072* (2013.01)

(58) Field of Classification Search
CPC ............ B29D 99/0014; B29D 99/0003; B29D 99/001; B29C 70/342; B29C 70/44; B29C 70/386; B29C 70/545; B29C 2793/00; B29C 70/38; B29C 2793/009; B29C 70/302; B64C 2001/0072; B64C 1/064; B64C 3/182; B29L 2031/3082; B29L 2031/3076; Y02T 50/40
See application file for complete search history.

(56) References Cited

U.S. PATENT DOCUMENTS

2007/0236354 A1    10/2007  Green
2012/0009372 A1*   1/2012   Meyer ................... B29C 70/304
                                                            428/60
(Continued)

FOREIGN PATENT DOCUMENTS

CN    1285266 A     2/2001
EP    3480002 A1    5/2019
(Continued)

OTHER PUBLICATIONS

Partial European Search Report issued Jul. 7, 2021 in corresponding EP Application No. 21156085.9, 14 pages.
(Continued)

*Primary Examiner* — Brian Handville
(74) *Attorney, Agent, or Firm* — MH2 Technology Law Group LLP

(57) ABSTRACT

A method of fabricating a solid laminate stringer on a composite panel, including unspooling one or more composite layers onto the composite panel; compacting the one or more composite layers unspooled onto the composite panel; cutting the one or more composite layers unspooled onto the composite panel; and curing the one or more composite layers unspooled onto the composite panel, wherein the one or more composite layers are unspooled continuously along a length corresponding to a length of the solid laminate stringer.

20 Claims, 13 Drawing Sheets

(51) Int. Cl.
  *B29C 70/44* (2006.01)
  *B64C 1/06* (2006.01)
  *B64C 3/18* (2006.01)
  *B29L 31/30* (2006.01)
  *B64C 1/00* (2006.01)

(56) References Cited

U.S. PATENT DOCUMENTS

| | | | |
|---|---|---|---|
| 2014/0099477 A1* | 4/2014 | Matsen | B29C 70/34 |
| | | | 156/60 |
| 2015/0217850 A1* | 8/2015 | Tien | B29D 99/0014 |
| | | | 264/258 |
| 2016/0144943 A1 | 5/2016 | Cheng et al. | |
| 2018/0273206 A1 | 9/2018 | Sokolov et al. | |
| 2018/0345603 A1* | 12/2018 | Bech | B29D 99/0028 |
| 2019/0047676 A1 | 2/2019 | Behzadpour et al. | |
| 2019/0047677 A1 | 2/2019 | Cheng et al. | |
| 2019/0263496 A1 | 8/2019 | Cheng et al. | |

FOREIGN PATENT DOCUMENTS

| | | |
|---|---|---|
| EP | 3549755 A1 | 10/2019 |
| EP | 3597414 A1 | 1/2020 |

OTHER PUBLICATIONS

Extended European Search Report issued Oct. 8, 2021 in corresponding EP Application No. 21156085.9, 13 pages.
Cheng, "Ply Stackings for Solid Laminate Stiffened Panel," U.S. Appl. No. 16/551,165, filed Aug. 26, 2019.
Communication pursuant to Article 94(3) EPC issued Sep. 22, 2022 in corresponding EP Application No. 21156085.9, 5 pages.
Communication pursuant to Article 94(3) EPC issued Feb. 28, 2023 in corresponding EP Application No. 21156085.9, 6 pages.
Communication pursuant to Article 94(3) EPC issued Aug. 8, 2023 in corresponding EP Application No. 21156085.9, 6 pages.
Requisition by the Examiner issued Jan. 18, 2024 in corresponding Canadian Application No. 3,101,081, 3 pages.

* cited by examiner

METHODS FOR FABRICATING SOLID LAMINATE STRINGERS ON A COMPOSITE PANEL

TECHNICAL FIELD

The present disclosure generally relates to solid laminate stringers, and more particularly to methods for fabricating solid laminate stringers on a composite panel.

BACKGROUND

Solid laminate stringers are used in in the aerospace industry as structural components of aircraft and/or to stiffen composite panels, such as fuselage, skin, and/or wing sections. Solid laminate stringers may be formed by stacking multiple layers of composite materials, such as resin-impregnated carbon fiber-reinforced plies.

However, current methods for fabricating solid laminate stringers require manual or semi-manual placement of the composite material layers or plies, may be limited to straight and/or constant width composite material layers or plies, and may require splicing the composite material layers or plies to account for curvatures in the composite panels or overall length of the solid laminate stringer. In addition, manual or semi-manual placement and splicing may generate flaws and wrinkling due to splicing or misalignment of the composite material layers or plies over curved surfaces during curing. The additional labor required by manual or semi-manual placement and splicing makes it harder to meet high volume and high rate production of airplane structures presently demanded.

Accordingly, there is a need for improved methods for fabricating solid laminate stringers that are less labor intensive and are able to accommodate widths, lengths and curvatures of the composite panels without splicing.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities exemplified in the present disclosure may be achieved by providing a method of fabricating a solid laminate stringer on a composite panel, including unspooling one or more composite layers onto the composite panel; compacting the one or more composite layers unspooled onto the composite panel; cutting the one or more composite layers unspooled onto the composite panel; and curing the one or more composite layers unspooled onto the composite panel, wherein the one or more composite layers are unspooled continuously along a length corresponding to a length of the solid laminate stringer.

The unspooling one or more composite layers onto the composite panel may include using overhead laser projection to synchronize the unspooling one or more composite layers according to at least one of a move speed, a rotation rate, a compacting pressure, and a heating temperature.

The unspooling one or more composite layers onto the composite panel may further include aligning at least one of edges and centerlines of the one or more composite layers on the composite panel to curved lines.

The unspooling one or more composite layers onto the composite panel may include using computer controlled spools to execute unspooling along pre-specified almost straight and slightly curved lines according to at least one of pre-determined move speeds, rotation rates, compacting pressures, and heating temperatures.

The curing one or more composite layers unspooled onto the composite panel may include placing a vacuum bag over the one or more composite layers and applying a compaction pressure to the one or more composite layers.

The vacuum bag may cover at least a portion of the composite panel, and the curing the one or more composite layers unspooled onto the composite panel may further include simultaneously curing the composite panel.

The solid laminate stringer may include two or more composite layers, and each of the two or more composite layers may include one or more composite plies.

The two or more composite layers may include spooled pre-pregs.

Each of the two or more composite layers may be spooled according to a lay-up design for the solid laminate stringer, and a length of the two or more composite layers may correspond to at least a length of the solid laminate stringer.

The solid laminate stringer does not include spliced composite layers.

A width of the solid laminate stringer may be from about 25 mm to about 150 mm.

The solid laminate stringer may include one or more lateral edges, and the one or more lateral edges may include a slope angle from about 12° to about 75°.

The solid laminate stringer may include one or more concave or convex curvatures along at least one of an x-axis, a y-axis, and a z-axis.

The curvature along the x-axis may have a radius from about 100 inches to about $10^{20}$ inches.

The curvature along the y-axis may have a radius from about 20 inches to about $10^{20}$ inches.

The one or more composite layers may include at least one of a base wrap layer and a top wrap layer.

The foregoing and/or other aspects and utilities exemplified in the present disclosure may also be achieved by providing a method for spooling a composite layer, including placing one or more composite plies onto a forming table; trimming the one or more composite plies placed on the forming table; compacting the one or more composite plies placed on the forming table; and spooling the compacted one or more composite plies onto a spool, wherein the one or more composite plies are placed continuously along a length of the forming table.

The placing one or more composite plies onto a forming table may include placing the one or more composite plies via automated fiber placement (AFP) or automated tape layup (ATL).

The trimming the one or more composite plies placed on the forming table, may include at least one of trimming the one or more composite plies to define a composite layer with two or more widths; trimming the one or more composite plies to define a composite layer with lateral edges having a slope angle between about 12° and about 75° trimming the one or more composite plies to define a composite layer with substantially symmetric lateral edges; and trimming the one or more composite plies to define a length of the composite layer.

The compacted one or more composite plies form a pre-preg composite layer, and wherein the spooling the compacted one or more composite plies onto a spool comprises spooling the pre-preg composite layer according to a lay-up design for a solid laminate stringer.

Further areas of applicability will become apparent from the detailed description provided hereinafter. It should be understood that the detailed description and specific examples, while indicating the preferred example of the disclosure, are intended for purposes of illustration only and are not intended to limit the scope of the disclosure.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
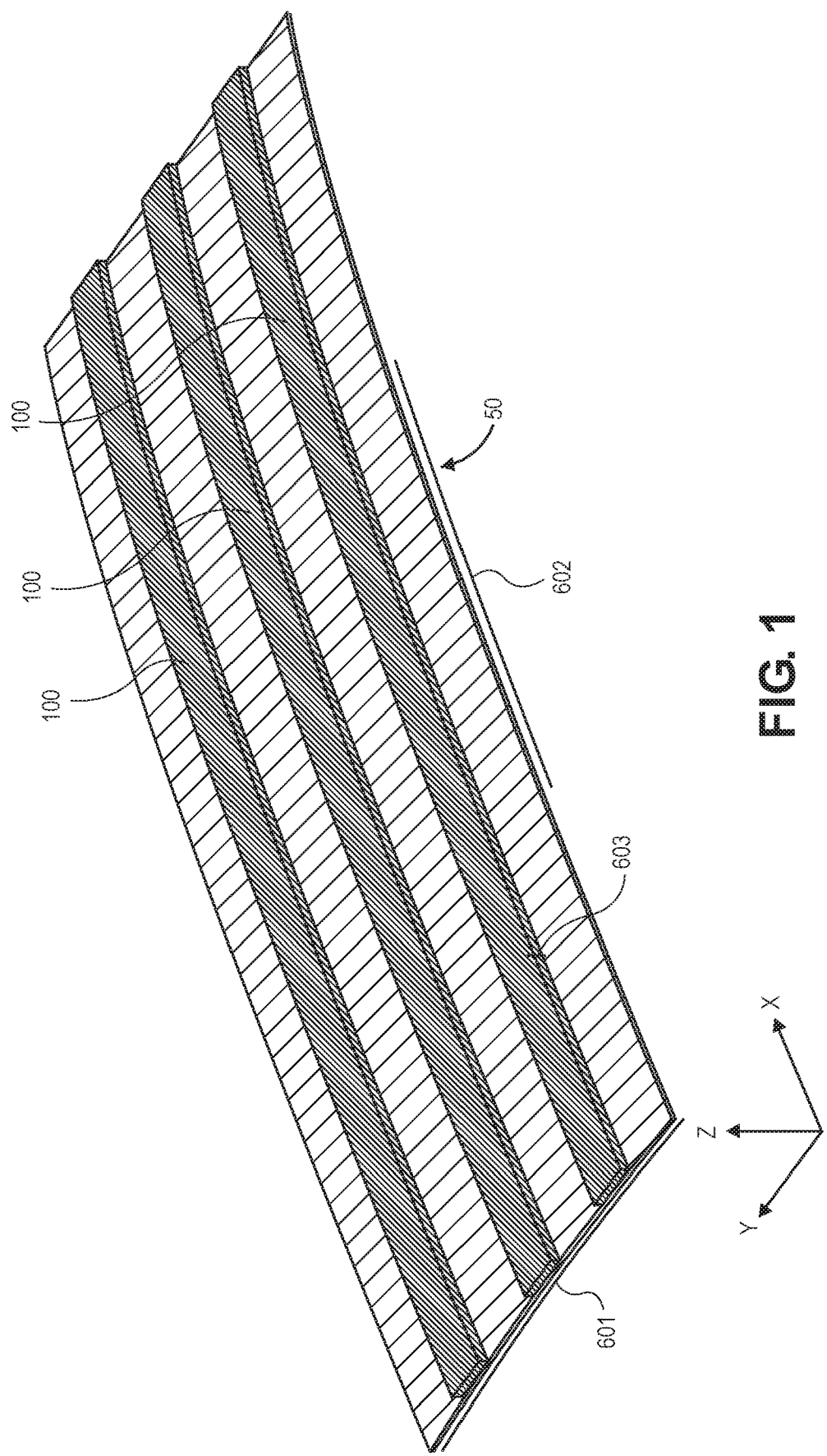
FIG. 1 illustrates a composite panel with solid laminate stringers according to an implementation of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes implementations containing A, B, or C, multiple examples of A, B, or C, or combinations of A/B, A/C, B/C, A/B/B/BB/C, AB/C, etc. In addition, throughout the specification, the meaning of "a," "an," and "the" include plural references. The meaning of "in" includes "in" and "on."

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the disclosure. The first object, component, or step, and the second object, component, or step, are both objects, components, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context. All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

The inventors have created new methods for fabricating solid laminate stringers on a composite panel. In some implementations the methods use automated digital model controlled processes to spool, unspool, compact, and cure multiple solid laminate stringers simultaneously on a skin substrate directly as one piece composite structure. The methods may streamline the fabrication process by eliminating manual or semi-manual placements and splicing of composite layers as they lie over curved surfaces. The methods may reduce the labor required, minimizing injuries, errors, and consequent defects, as well as wrinkling, during fabrication of high-quality and safe integrated composite parts. The methods may require less labor, materials, and fabrication floor space and may reduce the associated fabrication costs to enable large volume production at high rates.

Figure 2:
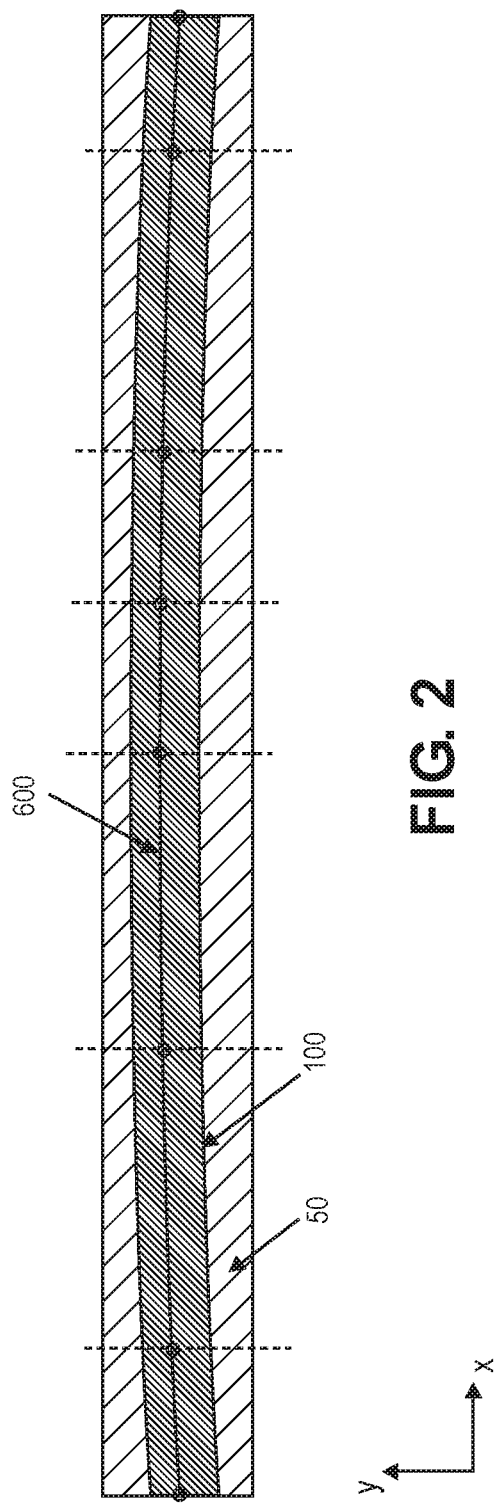
FIG. 2 illustrates a curved solid laminate stringer on a composite panel according to an implementation.

FIG. 1 illustrates a composite panel with solid laminate stringers according to an implementation of the present disclosure. FIG. 2 illustrates a curved solid laminate stringer on a composite panel according to an implementation.

Figure 3:
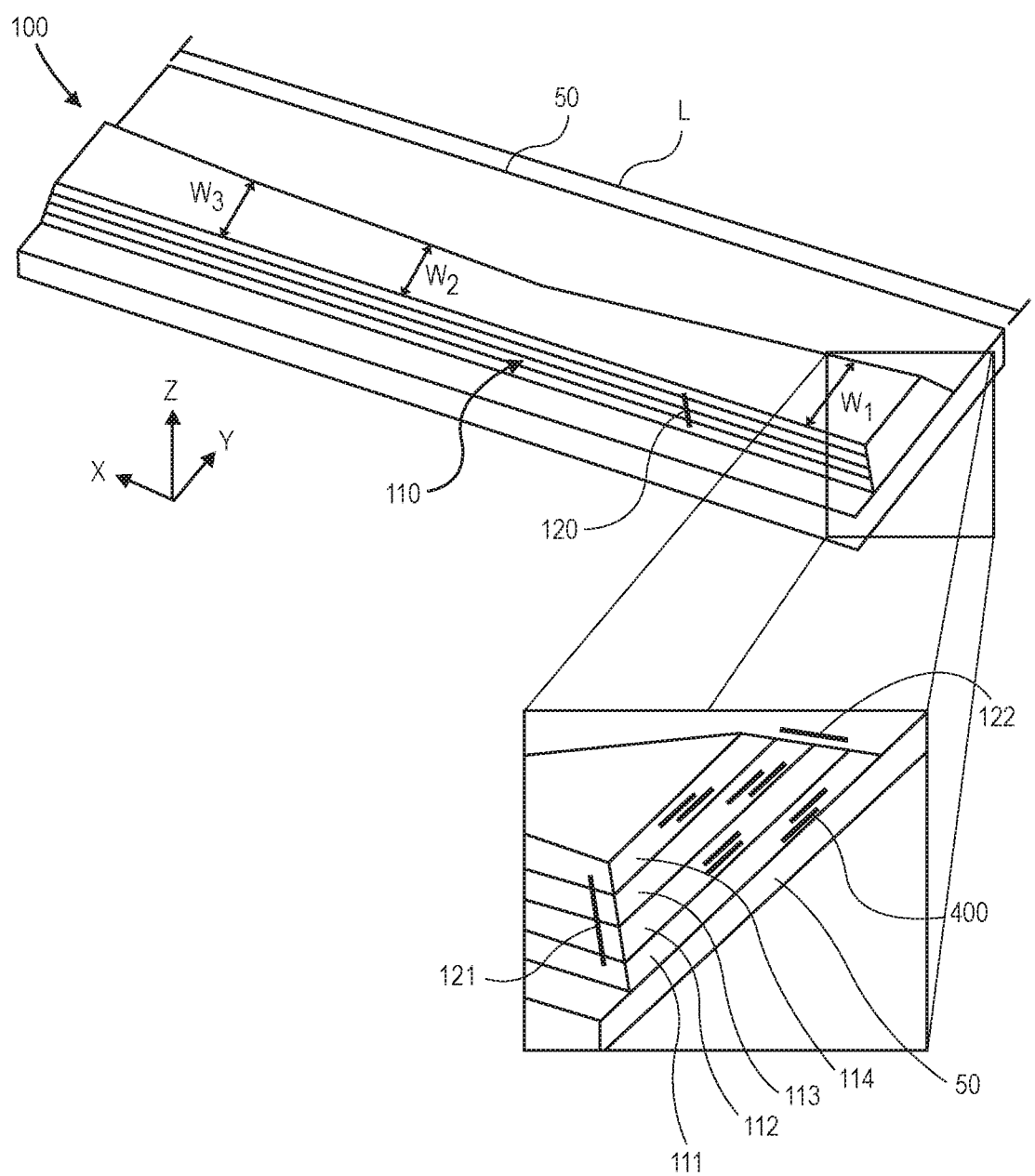
FIG. 3 illustrates a close-up of a solid laminate stringer on a composite panel according to an implementation.
Figure 4:
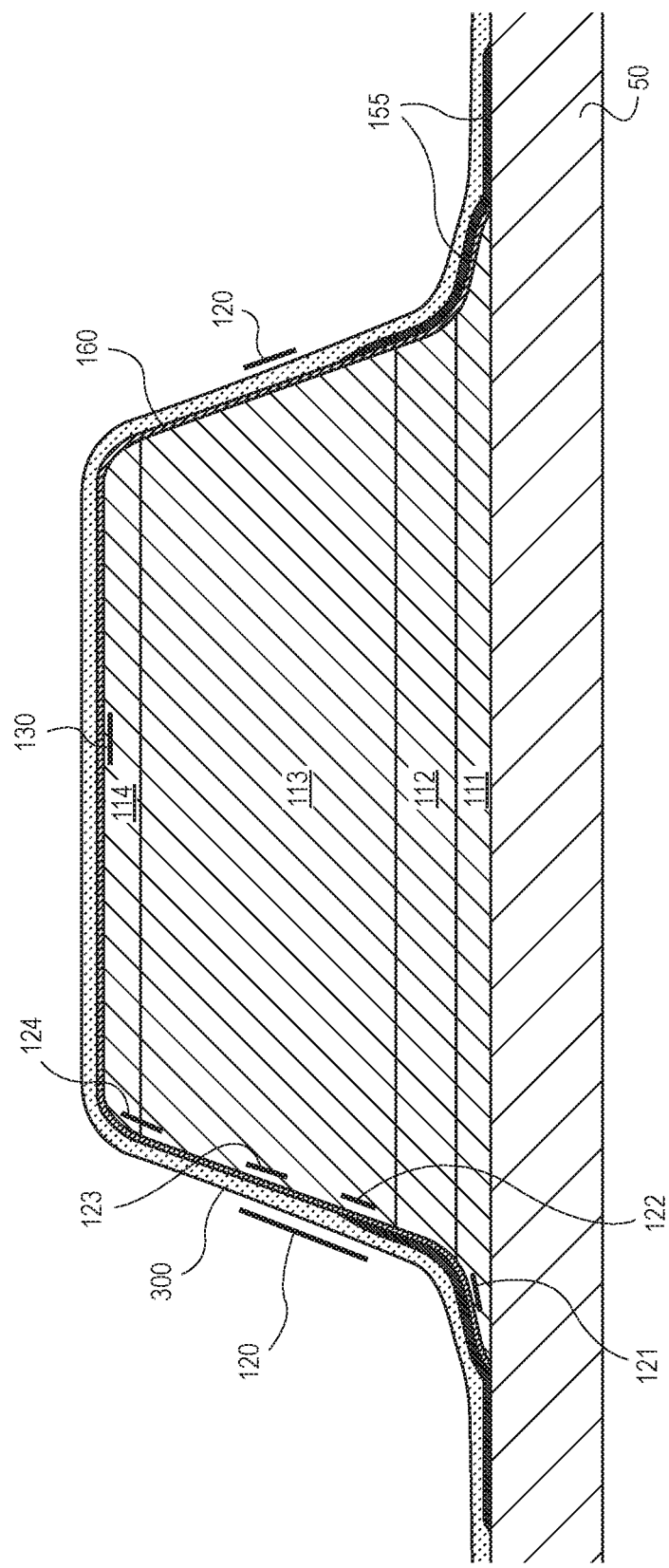
FIG. 4 illustrates a widthwise cross-sectional view of a solid laminate stringer on a composite panel according to an implementation.

FIG. 3 illustrates a close-up of a solid laminate stringer on a composite panel according to an implementation. FIG. 4 illustrates a widthwise cross-sectional view of a solid laminate stringer on a composite panel according to an implementation. As illustrated in FIGS. 1-4, one or more solid laminate stringers 100 may be formed on a composite panel 50 and each solid laminate stringer 100 may include two or more composite layers 110.

Each solid laminate stringer 100 may include two or more, three or more, four or more, five or more, six or more, seven or more, eight or more, nine or more, or 10 or more composite layers 110. For example, the solid laminate stringer 100 may include from 2 to about 20 composite layers 110. In other implementations, a solid laminate stringer 100 may include 20 or less, 15 or less, 10 or less, or six or less composite layers 110. For example a solid laminate stringer 100 may include 4 composite layers 110, 5 composite layers 110, or 6 composite layers 110.

For example, as illustrated in FIGS. 3-4, a solid laminate stringer 100 may include a first composite layer 111, a second composite layer 112, a third composite layer 113, and a fourth composite layer 114.

The composite layers 110 may include strong, lightweight, materials created by combining two or more functional components which may be cured into a single structure. For example, a composite layer 110 may include a filler bound in a resin matrix. Resins used in the composite layers 110 may include thermoplastic or thermoset resins, such as epoxy resins. The fillers may be reinforcing or non-reinforcing in nature and may be in a variety of shapes, for example, powders, particulates, flakes, foams, nano or micro tubes, continuous and discontinuous fibers reinforced tapes or fabrics, and the like.

In one implementation, the composite layers 110 include carbon fiber-reinforced plies of composite material or composite plies. For example, as illustrated in FIG. 3, a composite layer 110 may include one or more composite plies 400. The composite plies 400 may be made from unidirectional composite tape material impregnated with an epoxy resin.

In other implementations, the composite plies 400 may be made from woven fabric materials finished with a resin, such as fiberglass, carbon, or aramid fabrics infused with an epoxy resin.

The composite layers 110 may include pre-pregs. As used herein, the term "pre-preg" refers to pre-impregnated stacks of composite plies, such as epoxy impregnated unidirectional composite tape. A pre-preg may be flexible until it is cured, often by heat and pressure curing or curing within an autoclave.

Each composite layer 110 may include one or more composite plies 400. A composite layer 110 may include 1 or more, 2 or more, 3 or more, 4 or more, 5 or more, 6 or more, 7 or more, 8 or more, 9 or more, or 10 or more composite plies 400. In other implementations, a composite layer 110 may include 20 or less, 15 or less, 10 or less, or five or less composite plies 400. For example, a composite layer 110 may include 1 composite ply, 2 composite plies, or 3 composite plies.

The composite plies 400 forming each composite layer 110 may have a traditional orientation layup. For example, the composite plies 400 may be positioned at angles to the x-axis of the solid laminate stringer 100 including 0°, 45°, −45°, and 90°. In other implementations, the composite plies 400 forming each composite layer 110 may have a non-traditional orientation layup, and/or a mix of traditional and non-traditional orientation layups. The number of composite plies 400 positioned at these orientation angles maybe evenly distributed or may be unevenly distributed. Accordingly, each composite layer 110 may have one or more composite plies 400 and the one or more composite plies 400 may have different orientations.

The composite panel 50 may also include strong, lightweight, materials created by combining two or more functional components which may be cured into a single structure. For example, the composite panel 50 may include a plurality of composite layers laminated and cured into a single structure. The composite panel 50 may be configured to be compatible and/or bond to the solid laminate stringer 100 when cured.

In some implementations, the composite panel 50 may have a same or similar curing process than the solid laminate stringer 100. In other implementations, the composite panel 50 may be formed of same or similar composite layers 110 or composite plies 400 to reduce material incompatibility between the composite panel 50 and the solid laminate stringer 100, such as thermal cracking and bonding issues.

As illustrated in FIG. 3, a length L of the solid laminate stringer 100 may correspond to a length of the composite panel 50. For example, the length L of the solid laminate stringer 100 may extend and/or equal the full length of the composite panel 50.

A length of the one or more composite layers 110 may correspond to at least a length of the solid laminate stringer 100. For example, at least one of the one or more composite layers 110 may have a length equal to the length of the solid laminate stringer 100. In other implementations, all the composite layers 110 have a length at least equal to the length of the solid laminate stringer 100. In yet other implementations, at least one of the one or more composite layers 110 has a length longer than the length of the solid laminate stringer 100.

In some implementations, a length of the composite plies 400 forming each composite layer 110 is uniform. In other implementations, the length of the composite plies 400 forming each composite layer 110 varies. For example, the length of the composite plies 400 may vary along the x-axis (see FIG. 5).

The composite layers 110 may not be spliced. For example, the solid laminate stringer 100 may not include spliced composite layers 110. That is, a composite layer 110 may not be formed from one or more composite layers 110 spliced together along a length of the solid laminate stringer 100. The composite layers 110 may be single continuous composite layers 110. The composite layers 110 may be single continuous layers of composite plies 400.

A width of the solid laminate stringer 100 may be from about 25 mm to about 150 mm, from about 40 mm to about 130 mm, or from about 50 mm to about 110 mm. For example, a width of the solid laminate stringer 100 may be about 60 mm. The width of the solid laminate stringer 100 may be uniform along a length L of the stringer. In other implementations, the solid laminate stringer 100 may have a variable width. For example, as illustrated in FIG. 3, the solid laminate stringer 100 may have one or more widths (W1, W2, W3) along a length L of the solid laminate stringer 100.

The width of the solid laminate stringer 100 may vary from about 25 mm to about 150 mm along a length L of the solid laminate stringer 100. For example, a maximum width of the solid laminate stringer may be at least 2 times, 3 times, 4 times, 5 times, or 6 times the minimum width of the solid laminate stringer 100. In other implementations, a maximum width of a composite layer 110 may be at least 2 times, 3 times, or 4 times the minimum width of the composite layer 110.

The width of the solid laminate stringer 100 may vary along at least one of the x-axis and the z-axis. In some implementations, the width of the solid laminate stringer may vary along both the x-axis and the z-axis.

In some implementations, a width of the composite layers 110 forming the solid laminate stringer 100 is uniform along the z-axis. In other implementations, the width of the composite layers 110 forming the solid laminate stringer 100 varies along the z-axis. For example, a width of the solid laminate stringer 100 may be wider at the base, where it contacts the composite panel 50, than at the top.

Accordingly, as illustrated in FIG. 4, a width of a first composite layer 111 at a base of the solid laminate stringer 100 may be equal to or wider than a width of a second composite layer 112, a third composite layer 113, and/or a fourth composite layer 114. Similarly, a width of the second composite layer 112 may be equal to or wider than a width of the third composite layer 113 and/or the fourth composite layer 114. A width of the third composite layer 113 may also be equal to or wider than a width of the fourth composite layer 114.

As illustrated in FIGS. 3-4, the solid laminate stringer 100 may include lateral edges 120. The lateral edges 120 of the solid laminate stringer 100 are formed by the lateral edges of the composite layers 110 forming the solid laminate stringer 100. For example, as illustrated in FIG. 4, a lateral edge 120 is formed by a first lateral edge 121 of a first composite layer 111, a second lateral edge 122 of a second composite layer 112, a third lateral edge 123 of a third composite layer 113, and a fourth lateral edge 124 of a fourth composite layer 114.

The lateral edges 120 may have a slope angle from about 12° to about 75°. In other implementations, the lateral edges 120 may have a slope angle from about 12° to about 18°, from about 30° to about 60°, or from about 55° to about 72°.

The slope angle of the lateral edges 120 may vary along z-axis. The slope angle of the lateral edges 120 may vary along at least one of the x-axis, y-axis, and the z-axis. In some implementations, the slope angle of the lateral edges 120 may vary along both the x-axis and the z-axis.

In some implementations, as illustrated in FIG. 4, the slope angle of the lateral edges 120 is symmetrical. In other implementations, as illustrated in FIG. 4, a first slope angle of a first lateral edge 121 may be different from a second slope angle of a second lateral edge 122.

A slope angle of the lateral edges 120 may be lowest at the base, where it contacts the composite panel 50, than at the top. Accordingly, a slope angle of the lateral edge of the composite layer 110 at a base of the solid laminate stringer 100 may be equal or lower than a slope angle of the lateral edge of the other composite layers 110 forming the solid laminate stringer.

For example, as illustrated in FIG. 4, a slope angle of the first lateral edge 121 of a first composite layer 111 is lower than a slope angle of the second lateral edge 122 of the second composite layer 112, a slope angle of the third lateral edge 123 of a third composite layer 113, and a slope angle of the fourth lateral edge 124 of a fourth composite layer 114. Similarly, the slope angle of the second lateral edge 122 may be lower than the slope angle of the third lateral edge 123 and the fourth lateral edge 124.

In some implementations, the lateral edges 120 are continuous. That is, the lateral edges of the composite layers 110 forming the solid laminate stringer 100 form continuous lateral edges 120 of the solid laminate stringer. For example, the first lateral edge 121 may be continuous with the second lateral edge 122, the third lateral edge 123, and the fourth lateral edge 124.

As illustrated in FIGS. 1-2, the composite panel 50 may include one or more concave or convex curvatures along at least one of the x-axis, y-axis, and z-axis. Accordingly, the solid laminate stringer 100 may include one or more curvatures 600 to correspond to the curvatures of the composite panel 50. The curvatures 600 may be along at least one of the x-axis, y-axis, and z-axis, and the curvatures 600 may be convex or concave. For example, the solid laminate stringer may have a curvature 601 along the y-axis, a curvature 602 along the x-axis, and/or a curvature 603 along the z-axis.

The curvatures 600 along the x-axis may have a curvature in the x-z plane and/or the x-y plane with a radius from about 100 inches to about $10^{20}$ inches. For example, the curvature 602 may have a curvature with a radius from about 200 to about $10^{15}$ inches, from about 400 to about $10^{10}$ inches or from about 800 to about $10^5$ inches. For example, as illustrated in FIG. 2, the solid laminate stringer 100 may have a centerline curvature 600 along the x-axis in the x-y plane.

The curvatures 600 along the y-axis in the y-z plane may have a curvature with a radius from about 20 inches to about $10^{20}$ inches. For example, the curvature 601 may have a curvature with a radius from about 100 to about $10^{15}$ inches, from about 200 to about $10^{10}$ inches, or from about 400 to about $10^5$ inches.

The one or more composite layers 110 may include one or more wrap layers 150, and the solid laminate stringer 100 may include one or more wrap layers 150. For example, as illustrated in FIG. 4, the solid laminate stringer 100 may include a base wrap layer 155 and a top wrap layer 160 as examples of the one or more wrap layers 150.

The top wrap layer 160 may be configured to cover a top surface and lateral edges of the solid laminate stringer 100. For example, as illustrated in FIG. 4, the top wrap layer 160 is disposed over the lateral edges 121, 122, 123, and 124 of the first, second, third, and fourth composite layers 111, 112, 113, and 114 (forming the lateral edges 120) and over a top surface 130 of the fourth composite layer 114. In some implementations, the top wrap layer 160 may cover at least a portion of the composite panel 50. In some implementations, the top wrap layer 160 may cover exposed fiber ends present in the composite layers 110 due to trimming.

As illustrated in FIG. 4, the base wrap layer 155 may be disposed over the top wrap layer 160 along a lower portion of the lateral edges 120. The base wrap layer 155 may cover at least a portion of the top wrap layer 160. The base wrap may also be disposed over at least a portion of the composite panel 50. The base wrap layer 155 may cover at least a portion of the composite panel 50. In some implementations, the bottom wrap layer 155 enhances a connection of the solid laminate stringer 100 to the composite panel 50 to prevent delamination.

Figure 5:
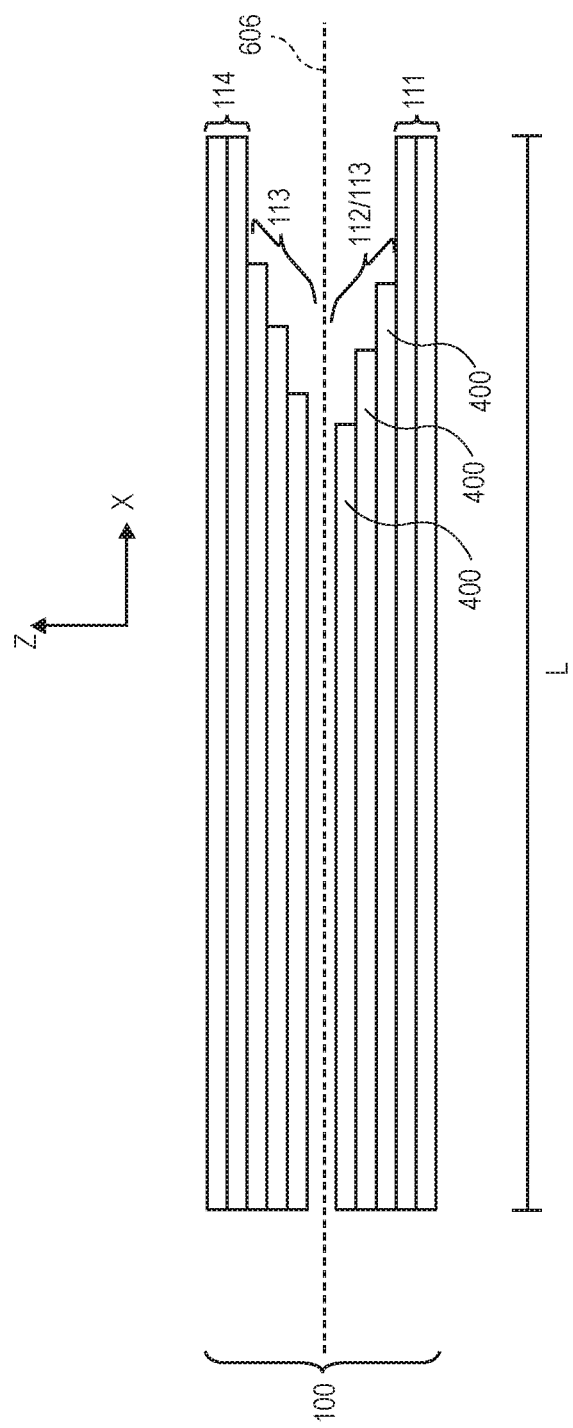
FIG. 5 illustrates a lengthwise stacking configuration to form composite layers of a solid laminate stringer according to an implementation.

As described above, a length of the composite plies 400 forming each composite layer 110 may vary. FIG. 5 illustrates a lengthwise stacking configuration to form composite layers of a solid laminate stringer according to an implementation.

As illustrated in FIG. 5, the length of the composite plies 400 forming the second composite layer 112 and the third composite layer 113 may vary along an axis of symmetry 606 along the x-axis. For example, the length of the composite plies 400 forming the second composite layer 112 and the third composite layer 113 may be successively terminated along the x-axis around the axis of symmetry 606. The length of the composite plies 400 forming the first composite layer 111 and the fourth composite layer 114 may be uniform and may correspond to at least the length L of the solid laminate stringer 100 and/or the length of the composite panel 50.

Figure 6:
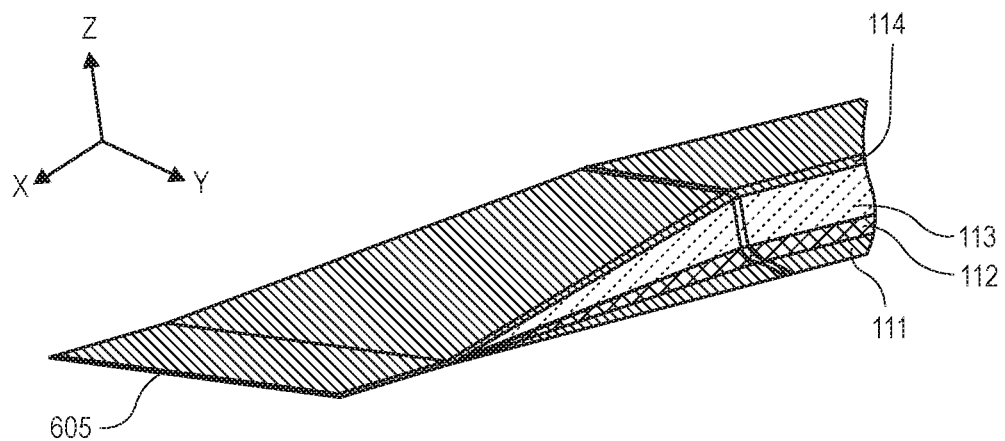
FIG. 6 illustrates runout ends of a solid laminate stringer according to an implementation.
Figure 7:
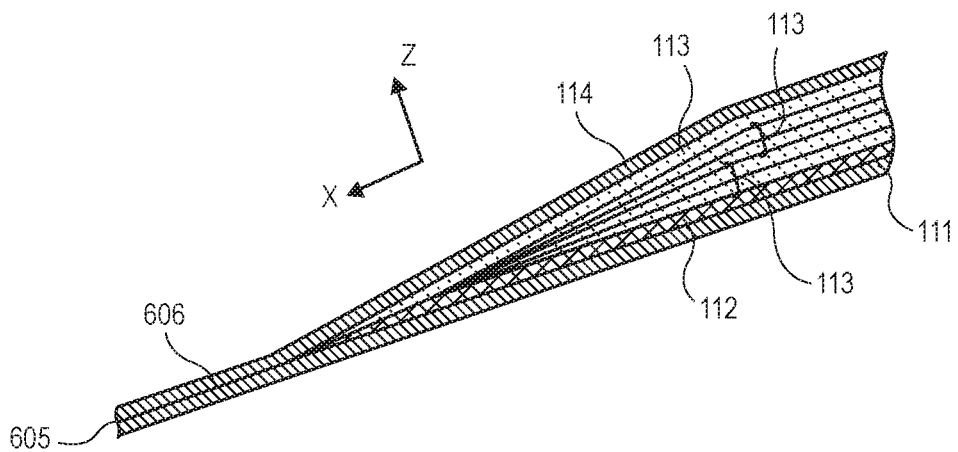
FIG. 7 illustrates a lengthwise cross-sectional view of runout ends of a solid laminate stringer according to an implementation.

FIG. 6 illustrates runout ends of a solid laminate stringer according to an implementation. FIG. 7 illustrates a lengthwise cross-sectional view of runout ends of a solid laminate stringer according to an implementation. As illustrated in FIGS. 6-7, the approximately symmetric arrangement of the composite plies in the composite layers 110 described above with respect to FIG. 5 may be advantageous at the runout ends of the solid laminate stringer 100. For example, as the composite plies 400 of the second and third composite layers 112 and 113 are successively terminated, a height of the solid laminate stringer 100 (along the z-axis) may be reduced along the x-axis. The termination of the composite plies 400 alternating from just above the line of symmetry 606 to just below the line of symmetry 606 may help maintain an approximate symmetry of the remaining composite plies 400 forming the composite layers 110.

For the purposes of illustrated the stepwise configuration of the successively terminated composite plies 400, the schematic view illustrated in FIG. 5 does not illustrate the remaining composite plies 400 converging at the line of symmetry 606, and thereby reducing the height of the solid laminate stringer 100 once formed. However, this effect is illustrated in FIG. 6-7. As illustrated in FIGS. 6-7, as the composite plies 400 of the second and third composite layers 112 and 113 are successively terminated along the line of symmetry 606, the height of the solid laminate stringer 100 is reduced in the x-axis toward a runout end 605. The runout end 605 may correspond to a total length of the solid laminate stringer 100 and/or may correspond to a total length of the composite panel 50. As illustrated in FIG. 6, a width of the solid laminate stringer 100 may increase as the height decreases towards the runout end 605. Further, the first composite layer 111 and the fourth composite layer 114 remain the lowermost and uppermost composite layers 110 of the solid laminate stringer 100. FIG. 7, showing a lengthwise cross-sectional view in the x-z plane, illustrates the fourth composite layer 114 and the first composite layer 111 converging to the line of symmetry 606 at the runout end 605. A top wrap layer 160 (not illustrated) may be disposed over the fourth composite layer 114.

Figure 8:
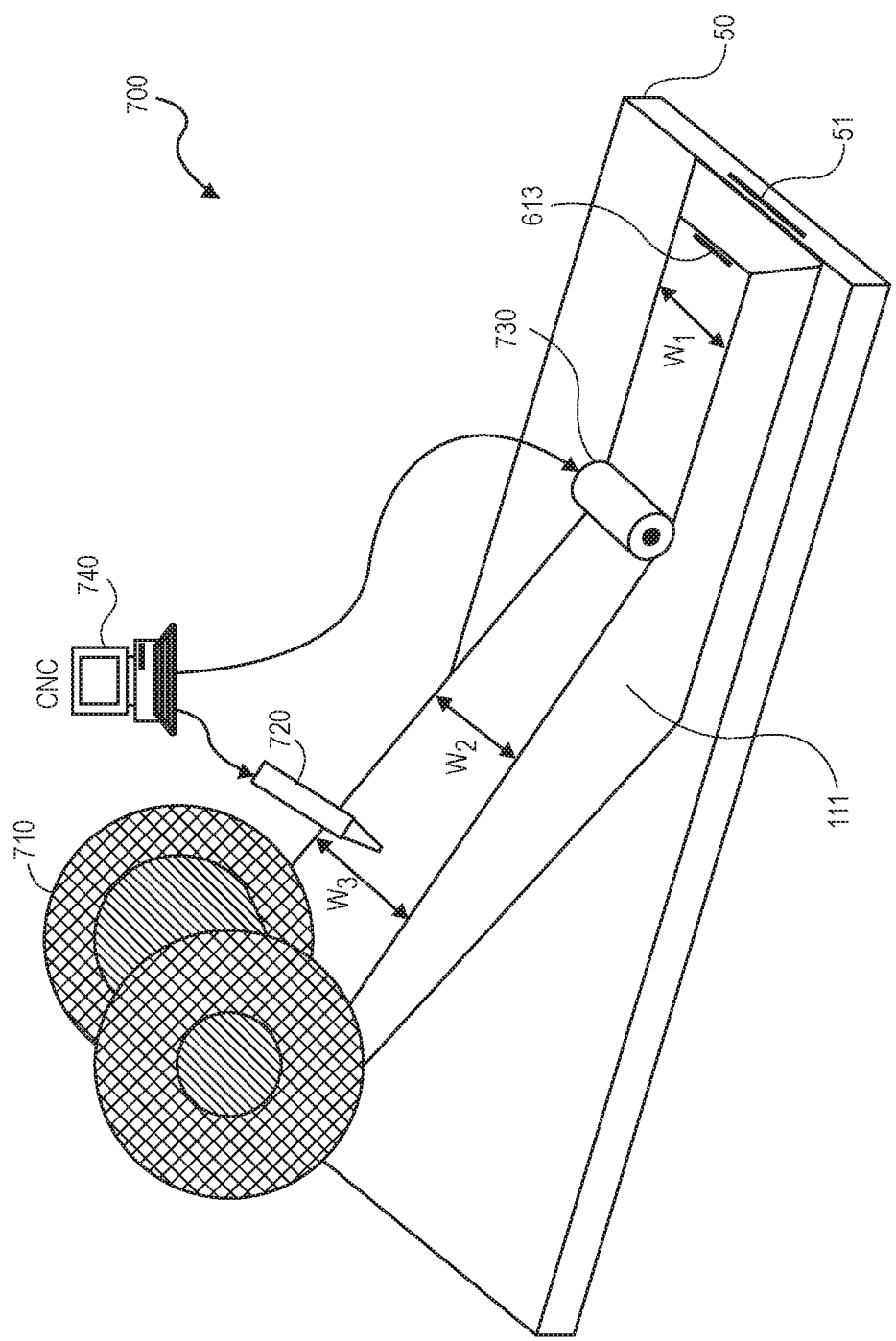
FIG. 8 illustrates a system for forming a solid laminate stringer on a composite panel according to an implementation.
Figure 9:
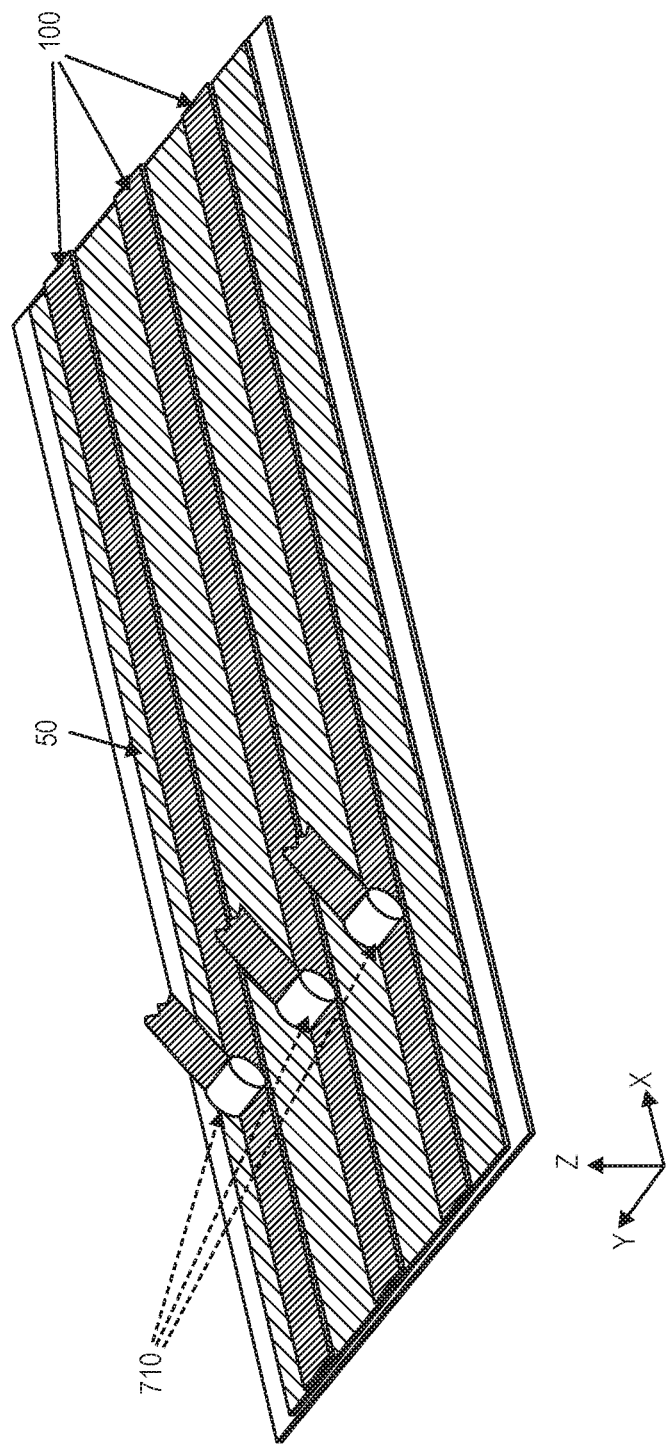
FIG. 9 illustrates a system for forming multiple solid laminate stringers on a composite panel according to an implementation.

FIGS. 8-9 illustrates a system for forming a solid laminate stringer on a composite panel according to an implementation. As illustrated in FIG. 8, a system 700 for forming a solid laminate stringer 100 on a composite panel 50 includes a spool 710, a cutter 720, a roller 730, and a computer 740.

Figure 10:
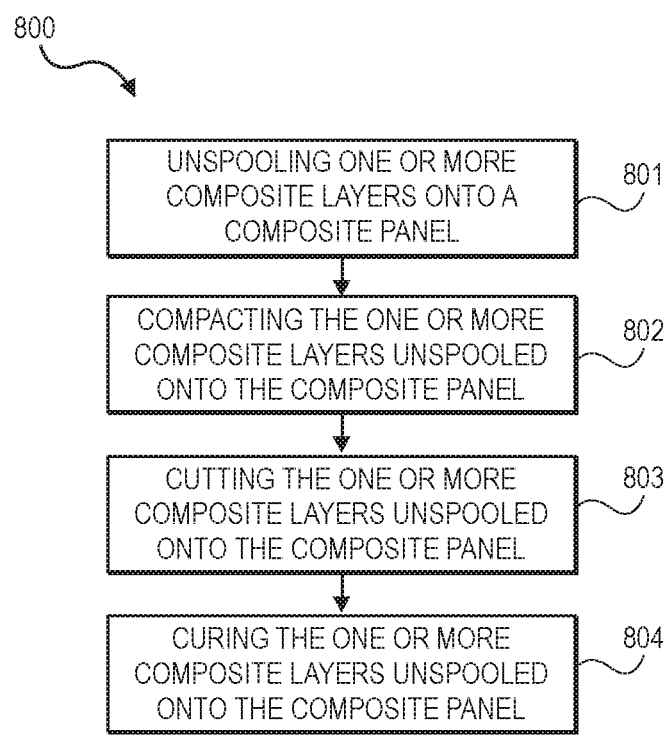
FIG. 10 illustrates a method for forming a solid laminate stringer on a composite panel according to an implementation.

FIG. 10 illustrates a method for forming a solid laminate stringer on a composite panel according to an implementation. FIG. 10 illustrates an example of a method that, for instance, could be used to fabricate a solid laminate stringer 100 as described above and as illustrated in FIG. 1-7. As illustrated in FIG. 10, a method 800 for forming a solid laminate stringer 100 on a composite panel 50 may be described with respect to the system 700 of FIG. 8 and the solid laminate stringer of FIGS. 1-7.

Figure 12:
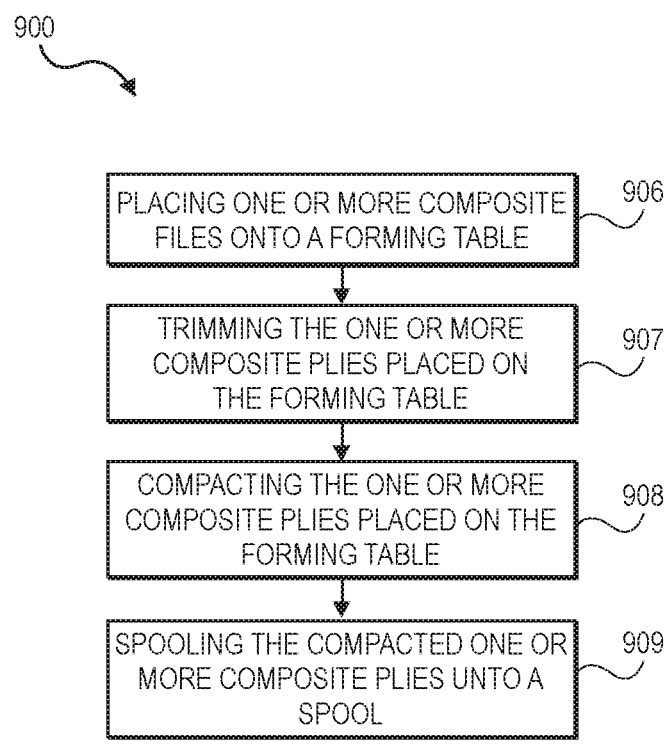
FIG. 12 illustrates a method for spooling a composite layer according to an implementation.

It should be understood that for this and other processes and methods disclosed herein, the methods of FIGS. 10 and 12, show functionality and operation of one or more possible implementations of the present disclosure. In this regard, each block in the methods of FIGS. 10 and 12 may represent a module, segment, or portion of a program code, which includes one or more instructions executable by a processor for implementing or causing specific logical functions or steps in the process. For example, the methods of FIGS. 10 and 12 may be implemented by one or more computing devices of a robotic assembly system. Alternative implementations are included within the scope of the implementations of the present disclosure, in which function may be executed out of order from that shown or discussed, including substantially concurrently, depending on the functionality involved, as would be understood by those reasonably skilled in the art.

The method 800 may start with operation 801. Operation 801 includes unspooling one or more composite layers 110 onto a composite panel 50.

The one or more composite layers 110 may be unspooled continuously along a length corresponding to a length of the solid laminate stringer 100. As used herein, the terms "unspooled continuously" refers to unspooling a composite layer 110 as a single continuous composite layers 110. A composite layer 110 unspooled continuously is not spliced. That is, a composite layer 110 unspooled continuously is not formed from one or more composite layers 110 spliced together along a length corresponding to a length of the solid laminate stringer 100.

As illustrated in FIG. 8, a spool 710 may be configured to hold the one or more composite layers 110. The spool 710 may be configured to deposit the one or more composite layers 110 onto the composite panel 50. For example, the spool 710 may be part of a robotic assembly configured to move above the composite panel 50 and deposit the one or more composite layers 110 from the spool 710 onto the composite panel 50 by unspooling the spool 710.

Unspooling the one or more composite layers 110 onto the composite panel 50 may include aligning edges and/or center lines of the one or more composite layers 110 in a pre-specified stacking sequence when unspooled onto the composite panel 50. For example, overhead laser projection may be used to align the edges of the one or more composite layers 110 when unspooled onto the composite panel 50. In one implementation, the spool 710 (or larger robotic assembly) which may be configured to move and rotate over the composite panel 50 includes one or more laser receivers configured to receive a continuous laser beam from an Overhead Laser Projector (OLP). The angle and distance to the OLP are automatically calculated by processor in the spool 710. The calculated angle and distance information can then be compared to a map or layout corresponding to the pre-defined solid laminate stringer 100 to determine the position of the spool 710 in relation to target locations of the unspooled one or more composite layers 110 of the pre-defined solid laminate stringer 100. The spool 710 can then be guided and moved while adjusting speed, rotation rate, compacting pressure, heating temperature, etc. based on streaming data according to a deposition width/thickness and surface curvature requirements to align edges or position of the one or more composite layers 110 when unspooled in the pre-specified stacking sequence onto the composite panel 50 and/or onto the one or more composite layers 110 already partially forming the solid laminate stringer 100 on the composite panel 50.

Accordingly, unspooling of the one or more composite layers 110 onto the composite panel 50 may include using overhead laser projection of the target locations to align edges and/or centerlines of the one or more composite layers 110 in a pre-specified sequence on the composite panel 50.

For example, as illustrated in FIG. 8, a first composite layer 111 may be deposited onto a composite panel 50 by unspooling the first composite layer 111 from a spool 710. The spool 710 may use overhead laser projection to align front edge 613 of the first composite layer 111 to correspond to the composite panel 50. For example, the spool 710 may deposit the first composite layer 111 starting at a front edge 51 of the composite panel 50.

As illustrated in FIG. 9, in some implementations, the system 700 may include one or more spools 710, and the one or more spools 710 may be configured to simultaneously deposit the one or more composite layers 110 onto the composite panel 50 to form one or more solid laminate stringers 100.

In some implementations, the computer 740 is used to guide and control the spool 710 to move along pre-specified path lines at pre-determined speed or rates. The path lines may include almost straight and/or slight curvatures 600 (see FIG. 2). For example, the computer 740 may be used to store a map or layout corresponding to the solid laminate stringer 100, pre-specified slightly curved path lines, pre-determined move speeds, rotation rates, compacting pressure, heating temperature etc., a stacking sequence or indices, a layout order, pre-defined geometry locations of edge lines and centerlines, pre-calculated width, curvature, and length, or design for the one or more composite layers 110, and an overall geometry or shape for the solid laminate stringer. In one implementations, the computer 740 stores a length for the one or more composite layers 110 corresponding to a length of the solid laminate stringer 100. The computer 740 may be used to guide and move the spool 710 in pre-determined move speeds, rotation rates, compacting pressure, heating temperature on pre-specified path lines according to the unspooling command steps executed in sequence and the stored information described above.

Accordingly, in some implementations, the unspooling of the one or more composite layers 110 onto the composite panel 50 includes using overhead laser projection to synchronize the unspooling one or more composite layers 110 according to at least one of a move speed, a rotation rate, a compacting pressure, and a heating temperature. The unspooling of the one or more composite layers 110 onto the composite panel 50 may align edges of the one or more composite layers 110 on the composite panel 50 to curvatures 600. The unspooling of the one or more composite layers 110 onto the composite panel 50 may include using a computer 740 to control spools 710 to execute unspooling along pre-specified almost straight and/or slight curvatures 600 according to at least one of pre-determined move speeds, rotation rates, compacting pressures, and heating temperatures.

Operation 802 includes compacting the one or more composite layers 110 unspooled onto the composite panel 50.

As illustrated in FIG. 8, the system 700 may include a compacting roller 730. The compacting roller 730 may be configured to compact a composite layer 110 unspooled onto the composite panel 50 and/or to compact a composite layer 110 unspooled onto other composite layers 110 already partially forming the solid laminate stringer 100 on the composite panel 50. The compacting roller 730 may be configured to apply a pressure and/or heating temperature to the unspooled composite layer 110.

Operation 803 includes cutting the one or more composite layers 110 unspooled onto the composite panel 50.

As illustrated in FIG. 8, the system 700 may include a cutter 720. The cutter 720 may be configured to cut a composite layer 110 unspooled onto the composite panel 50 and/or to cut a composite layer 110 unspooled onto other composite layers 110 already partially forming the solid laminate stringer 100 on the composite panel 50.

In operation 803, the cutter 720 cuts the composite layer 110 to a desired length. For example, as illustrated in FIG. 10, the cutter 720 may cut the first composite layer 111 to a length corresponding to a length of the solid laminate stringer 100 and/or the composite panel 50. The length of the first composite layer 111 may correspond to the full length of the solid laminate stringer 100 and/or the composite panel 50.

In some implementations, the one or more composite layers 110 are continuous within the spool 710. That is, a composite layer 110 may include the first, second, third, and/or fourth composite layer 111, 112, 113, and 114 as a continuous composite layer 110. Cutting the first composite layer 111 exposes a front edge 623 (not illustrated) of the second composite layer 112. The spool 710 may then align a front edge 623 of the second composite layer 112 with the front edge 613 of the first composite layer 111 or a front edge 51 of the composite panel 50 when depositing the second composite layer 112. However, in other implementations, as illustrated in FIG. 9, the spool 710 may include one or more spools 710, and each spool 710 may include a composite layer 110. For example, one or more spools 710 may include the first, second, third, and/or fourth composite layers 111, 112, 113, and 114, and the one or more spools 710 may work together in sequence to deposit solid laminate stringers 100 onto the composite panel 50.

While the operation above are described with respect to the first composite layer 111, it is understood that other composite layers 110 may be similarly unspooled, compacted, and cut onto the composite panel 50, including the second, third, and fourth composite layers 112, 113, and 114, and the base wrap layer 155 and top wrap layer 160, as illustrated in FIG. 4.

Operation 804 includes curing the one or more composite layers 110 unspooled and compacted onto the composite panel 50.

Curing of the one or more composite layers 110 may include applying heat and pressure to the one or more composite layers 110. For example, curing may include using an autoclave under heat and pressure processing conditions corresponding to the material of the one or more composite layers 110 and/or the composite panel 50.

As illustrated in FIG. 4, operation 804 may include placing a vacuum bag 300 over the one or more composite layers 110 forming the solid laminate stringer 100 and the composite panel 50. In some implementations, the vacuum bag 300 covers at least a portion of the composite panel 50. The vacuum bag 300 may be used to apply a compaction pressure to the one or more composite layers 110 prior to and during curing under operation 804. Accordingly, in some implementations, the curing of the one or more composite layers 110 unspooled onto the composite panel 50 includes placing a vacuum bag 300 over the one or more composite layers 110 and applying a compaction pressure to the one or more composite layers 110.

In some implementations, operation 804 includes simultaneously curing the one or more composite layers 110 forming the solid laminate stringer 100 with the curing of the composite panel 50. Accordingly, the vacuum bag 300 may cover at least a portion of the composite panel 50, and curing the one or more composite layers 110 unspooled onto the composite panel 50 may include simultaneously curing the composite panel 50.

Figure 11:
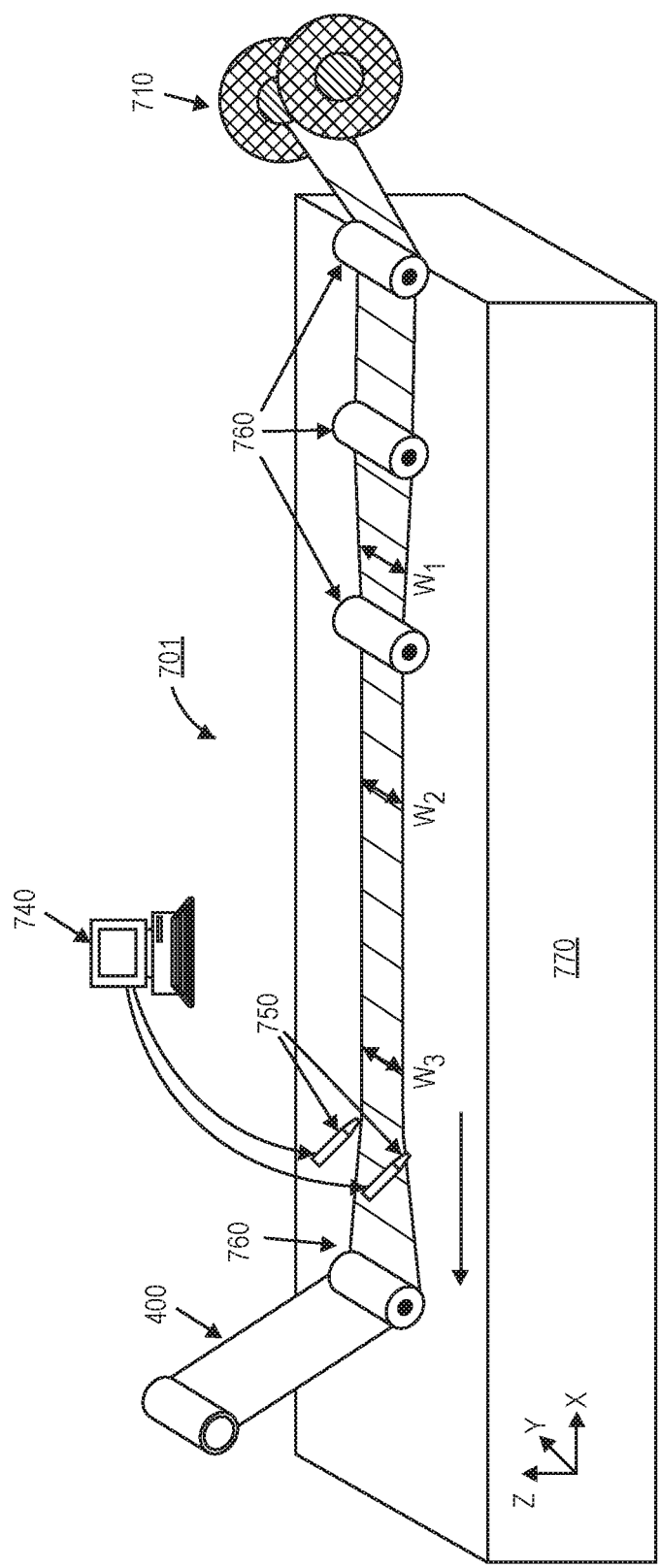
FIG. 11 illustrates a system for spooling a composite layer according to an implementation.

FIG. 11 illustrates a system for spooling a composite layer according to an implementation. As illustrated in FIG. 11, a system 701 for spooling a composite layer 110 includes a spool 710, one or more cutters 750, one or more rollers 760, a forming table 770, and a computer 740.

FIG. 12 illustrates a method for spooling a composite layer according to an implementation. FIG. 12 illustrates an example of a method that, for instance, could be used to spool a composite layer 110 as described above and as illustrated in FIG. 1-7. As illustrated in FIG. 12, a method 900 for spooling a composite layer may be described with respect to the system 701 of FIG. 11 and the composite layers 110 of FIGS. 1-7.

Method 900 may start with placing one or more composite plies onto a forming table in operation 906. As illustrated in FIG. 11, one or more composite plies 400 may be placed onto a forming table 770 as part of forming a composite layer 110. The one or more composite plies 400 may be placed on the forming table 770 via automated fiber placement (AFP) or automated tape layup (ATL). In some implementations, operation 906 includes applying a vacuum through the forming table 770 and to the one or more composite plies 400 to hold them in position.

The one or more composite plies may be placed continuously along a length of the forming table. As used herein, the terms "placed continuously" refers to placing a composite ply 400 as a single continuous composite ply 400. A composite ply 400 placed continuously is not spliced. That is, a composite ply 400 placed continuously is not formed from one or more composite plies 400 spliced together along a length of the forming table.

Operation 906 may include placing the one or more composite plies 400 according to a particular orientation layup. The orientation layup may be stored in the computer 740 and may be used to control the AFP and/or ATL machines to form the composite layer 110.

Operation 907 includes trimming the one or more composite plies placed on the forming table. As illustrated in FIG. 11, one or more cutters 750 may be used to trim the one or more composite plies 400 placed on the forming table 770. The one or more cutters 750 may include ultrasonic cutters 750.

The one or more cutters 750 may be used to define a width of the one or more composite plies 400 placed on the forming table 770 and/or the resulting composite layer 110. The width may be uniform, or as illustrated in FIG. 11, the width may include one or more widths (W1, W2, W3) along a length of the one or more composite plies 400.

The one or more cutters 750 may be used to define lateral edges for the one or more composite plies 400 placed on the forming table 770 and/or the resulting composite layer 110. The lateral edges may be uniform, or as illustrated in FIG. 4, the lateral edges may have a slope angle between 12° and 75°.

The one or more cutters 750 may be used to define the shape for the one or more composite plies 400 placed on the forming table 770 and/or the resulting composite layer 110. The shape may be substantially symmetric. For example, both lateral edges may be at about the same distance of a half layer width from a layer centerline along a longitudinal direction and may have about the same slope angle.

The one or more cutters 750 may be used to define a length of the one or more composite plies 400 placed on the forming table 770 and/or the resulting composite layer 110. The length may correspond to a length of the solid laminate stringer 100 and/or the composite panel 50. In other implementations, a length of the one or more composite plies 400 may correspond to runout ends of the solid laminate stringer 100.

Operation 908 includes compacting the one or more composite plies 400 placed on the forming table. As illustrated in FIG. 11, the system 701 may include one or more rollers 760. The one or more rollers 760 may be configured to compact the one or more composite plies 400 placed the forming table 770 into a composite layer 110.

In some implementations, the one or more rollers 760 impart or maintain a tension to the one or more composite plies 400 while compacting in operation 908. Compacting or tensioning the one or more composite plies 400 may mitigate wrinkling when the resulting composite layer 110 is spooled.

In some implementations, the one or more rollers 760 prevent ply wrinkles and drive out remaining air voids within and between the composite plies 400 to reduce ply distortion or defects. The one or more rollers 760 may also generate tension to straighten out the composite plies 400 to prevent wrinkling and slippage when the resulting composite layer 110 is spooled.

Operation 909 includes spooling the one or more composite plies 400 compacted into a composite layer 110 onto a spool 710. As illustrated in FIG. 11, a composite layer 110 (resulting from the compacting and tensioning of the composite plies 400) is spooled onto a spool 710. The one or more composite layers 110 may include spooled pre-pregs.

Operation 909 may include heating and cooling the compacted one or more composite plies 400. For example, in order to mitigate wrinkling of the one or more composite plies 400 compacted into a composite layer 110 when spooled, the one or more composite plies 400 may be heated first during or after a compacting operation 908. Similarly, in order to mitigate tackiness, the one or more composite plies 400 may be cooled during or before spooling operation 909.

The composite layer 110 resulting from the compacting of the one or more composite plies 400 may include a pre-preg.

The composite layer 110 spooled on the spool 710 may include a continuous composite layer 110 including one or more composite plies 400.

The composite layer 110 resulting from the compacting of the one or more composite plies 400 may include variable widths and curvatures to correspond to the widths or curvatures of a solid laminate stringer 100.

In some implementations, the computer 740 stores a lay-up design for the solid laminate stringer 100, and the composite layer 110 is spooled onto the spool 710 to correspond to the shape, curves, and geometry of the desired solid laminate stringer 100. In other implementations, one or more composite layers 110 are spooled onto one or more spools 710, and the computer 740 controls the lay-up of the one or more composite layers 110 by the one or more spools 710 to create a solid laminate stringer 100 on a composite panel 50. Accordingly, in some implementations, the composite layers 110 are spooled according to a lay-up design for the solid laminate stringer 100.

Figure 13:
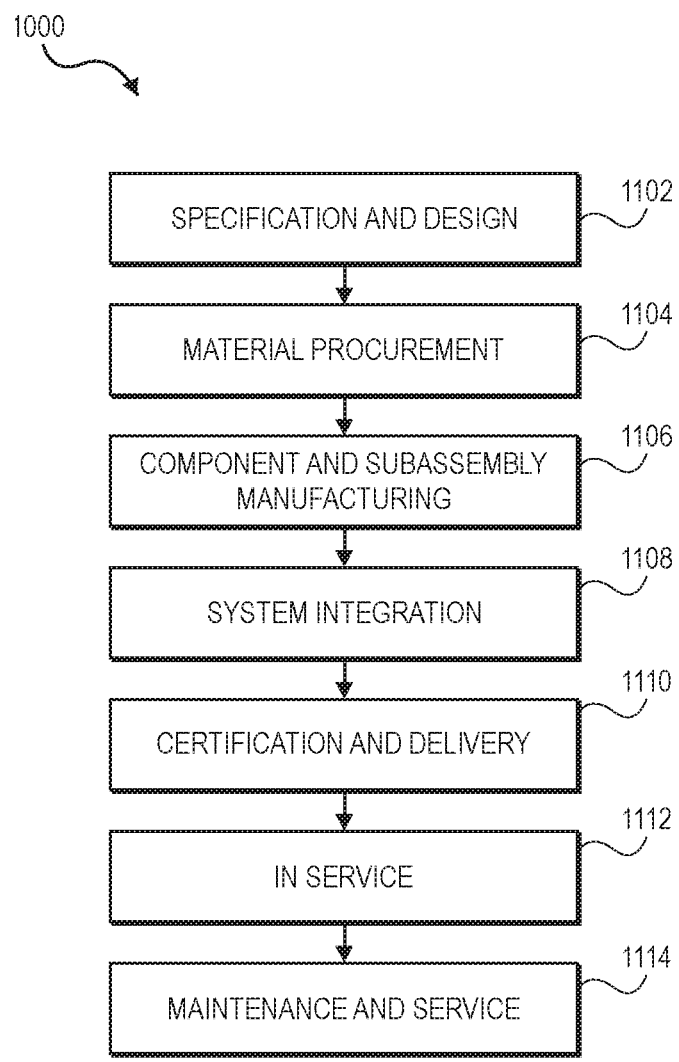
FIG. 13 illustrates a flow diagram of aircraft production and service methodology according to an implementation.
Figure 14:
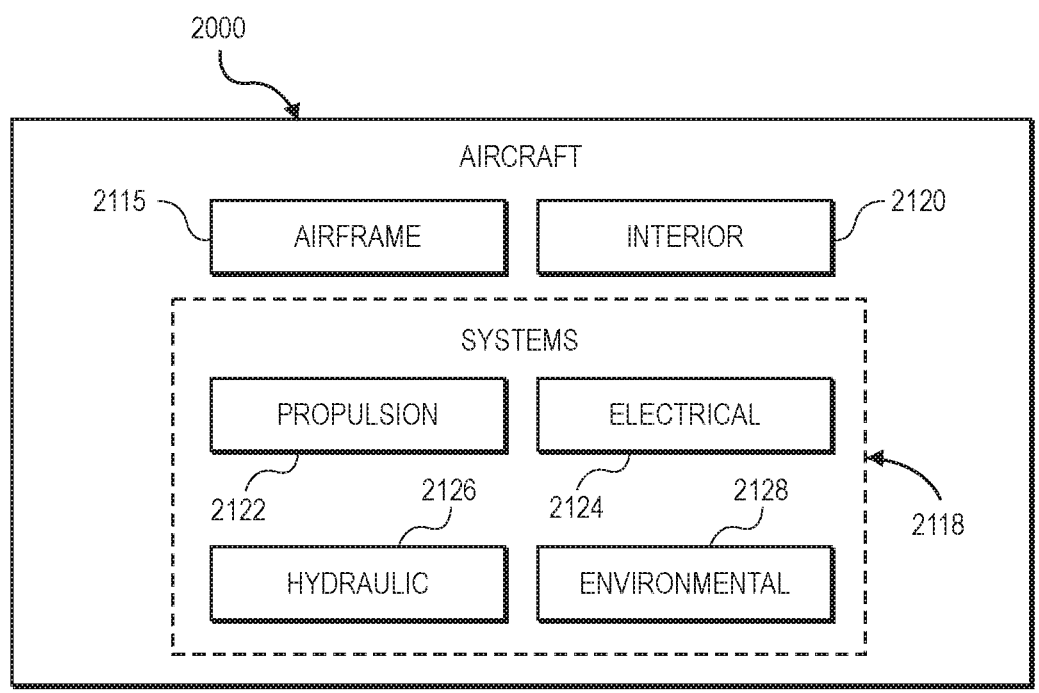
FIG. 14 illustrates a block diagram of an aircraft according to an implementation.

Implementations of the present disclosure may find use in a variety of potential applications, particularly in the transportation industry, including for example, aerospace, marine, automotive applications, and other application where solid laminate stringers are desired. Thus, referring now to FIGS. 13 and 14, implementations of the disclosure may be used in the context of an aircraft manufacturing and service method 1000 as shown in FIG. 13 and an aircraft 2000 as shown in FIG. 14. During pre-production, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods exemplified herein may be employed during any one or more of the stages of the aircraft manufacturing and service method 1000. For example, components or subassemblies corresponding to production process 1106 may be fabricated or manufactured in a manner similar to components or subassemblies produced while the aircraft 2000 is in service. Also, one or more apparatus examples, method examples, or a combination thereof may be utilized during the production stages 1106 and the 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 13 and 14 describe the disclosure with respect to aircraft and aircraft manufacturing and servicing, the present disclosure is not limited thereto. The solid laminate stringers systems and methods of the present disclosure may also be used for spacecraft, satellites, submarines, surface ships, automobiles, tanks, trucks, power plants, and any other suitable type of objects.

The present disclosure has been described with reference to exemplary implementations. Although a few implementations have been shown and described, it will be appreciated by those skilled in the art that changes can be made in these implementations without departing from the principles and spirit of preceding detailed description. It is intended that the present disclosure be construed as including all such modifications and alterations insofar as they come within the scope of the appended claims or the equivalents thereof.

What is claimed, is:

1. A method of fabricating a solid laminate stringer on a composite panel, comprising:
   unspooling one or more composite layers onto the composite panel, comprising aligning at least one of edges and centerlines of the one or more composite layers unspooled onto the composite panel to form the solid laminate stringer;
   compacting the one or more composite layers unspooled onto the composite panel;
   cutting the one or more composite layers unspooled onto the composite panel; and
   curing the one or more composite layers unspooled onto the composite panel,
   wherein a length of the solid laminate stringer corresponds to a length of the composite panel, and wherein the one or more composite layers are unspooled continuously along a length corresponding to the length of the solid laminate stringer and are stacked lengthwise onto the composite panel to form the solid laminate stringer.

2. The method of claim 1, wherein the unspooling one or more composite layers onto the composite panel comprises using overhead laser projection to synchronize the unspooling one or more composite layers according to at least one of a move speed, a rotation rate, a compacting pressure, and a heating temperature.

3. The method of claim 2, wherein the unspooling one or more composite layers onto the composite panel further comprises aligning at least one of edges and centerlines of the one or more composite layers on the composite panel to curved lines.

4. The method of claim 1, wherein the unspooling one or more composite layers onto the composite panel comprises using computer controlled spools to execute unspooling along pre-specified slightly curved lines according to at least one of pre-determined move speeds, rotation rates, compacting pressures, and heating temperatures.

5. The method of claim 1, wherein the curing the one or more composite layers unspooled onto the composite panel comprises placing a vacuum bag over the one or more composite layers and applying a compaction pressure to the one or more composite layers.

6. The method of claim 5, wherein the vacuum bag covers at least a portion of the composite panel, and wherein the curing the one or more composite layers unspooled onto the composite panel further comprises simultaneously curing the composite panel.

7. The method of claim 1, wherein the solid laminate stringer comprises two or more composite layers, and
wherein each of the two or more composite layers comprises one or more composite plies.

8. The method of claim 7, wherein the two or more composite layers comprise spooled pre-pregs.

9. The method of claim 8, wherein each of the two or more composite layers are spooled according to a lay-up design for the solid laminate stringer, and
wherein a length of the two or more composite layers corresponds to at least a length of the solid laminate stringer.

10. The method of claim 1, wherein the solid laminate stringer does not include spliced composite layers.

11. The method of claim 1, wherein a width of the solid laminate stringer is from about 25 mm to about 150 mm.

12. The method of claim 1, wherein the solid laminate stringer comprises one or more lateral edges, and wherein the one or more lateral edges comprise a slope angle from about 12° to about 75°.

13. The method of claim 1, wherein the solid laminate stringer comprises one or more concave or convex curvatures along at least one of an x-axis, a y-axis, and a z-axis.

14. The method of claim 13, wherein the curvature along the x-axis has a radius from about 100 inches to about $10^{20}$ inches.

15. The method of claim 13, wherein the curvature along the y-axis has a radius from about 20 inches to about $10^{20}$ inches.

16. The method of claim 1, wherein the one or more composite layers comprises at least one of a base wrap layer and a top wrap layer.

17. The method of claim 3, wherein the unspooling one or more composite layers onto the composite panel comprises aligning the centerlines of the one or more composite layers on the composite panel to curved lines.

18. The method of claim 1, wherein the one or more composite layers are single continuous composite layers.

19. The method of claim 13, wherein the unspooling one or more composite layers onto the composite panel comprises aligning the one or more composite layers to the one or more concave or convex curvatures.

20. The method of claim 2, wherein the unspooling one or more composite layers onto the composite panel comprises synchronizing one or more spools to simultaneously deposit the one or more composite layers.

* * * * *